(12) United States Patent
Rasile

(10) Patent No.: US 8,815,358 B2
(45) Date of Patent: Aug. 26, 2014

(54) CONDIMENT PACKAGE AND PACKAGING MATERIAL HAVING EXTENDED SHELF-LIFE

(75) Inventor: William Rasile, Allison Park, PA (US)

(73) Assignee: H.J. Heinz Company, Pittsburgh, PA (US)

( * ) Notice: Subject to any disclaimer, the term of this patent is extended or adjusted under 35 U.S.C. 154(b) by 0 days.

(21) Appl. No.: 12/909,134

(22) Filed: Oct. 21, 2010

(65) Prior Publication Data

US 2011/0097020 A1    Apr. 28, 2011

Related U.S. Application Data

(60) Provisional application No. 61/254,486, filed on Oct. 23, 2009.

(51) Int. Cl.
| | |
|---|---|
| *B32B 1/02* | (2006.01) |
| *B65D 81/24* | (2006.01) |
| *B65D 81/30* | (2006.01) |
| *B32B 15/08* | (2006.01) |
| *B32B 27/36* | (2006.01) |
| *B32B 15/20* | (2006.01) |

(52) U.S. Cl.
CPC ............... *B65D 81/24* (2013.01); *B65D 81/30* (2013.01); *B32B 15/08* (2013.01); *B32B 27/36* (2013.01); *B32B 15/20* (2013.01)

USPC ....... 428/35.9; 428/34.7; 428/35.3; 428/35.4; 428/36.6; 428/36.7

(58) Field of Classification Search
USPC ................... 428/34.1, 34.4–34.9, 35.2–35.4, 428/35.7–35.9, 36.4, 36.6–36.91, 457, 458, 428/461–463, 469–472.2, 474.4–477.7, 428/480, 482, 483, 500–506, 515–523, 688, 428/689, 699, 701, 702
See application file for complete search history.

(56) References Cited

U.S. PATENT DOCUMENTS 7,288,313 B2 * 10/2007 Sasaki et al. .................. 428/216

* cited by examiner

*Primary Examiner* — Walter B Aughenbaugh
(74) *Attorney, Agent, or Firm* — Greenblum & Bernstein, P.L.C.

(57) ABSTRACT

A pouch-like package for long-term storage of a highly acidic condiment is fabricated from a flexible sheet material having a light-blocking sheet, such as aluminum foil, coextruded between a printable layer, which may be a polymeric material such as PET, and a barrier layer, which may be a polymeric material such as PET coated on one side by a thin layer of aluminum oxide. Suitable adhesives may be used between the printable layer, the light-blocking sheet, and the barrier layer. If desired, a sealant such as acrylonitrile may be applied to the surface of the barrier layer.

39 Claims, 1 Drawing Sheet

FIG. 1
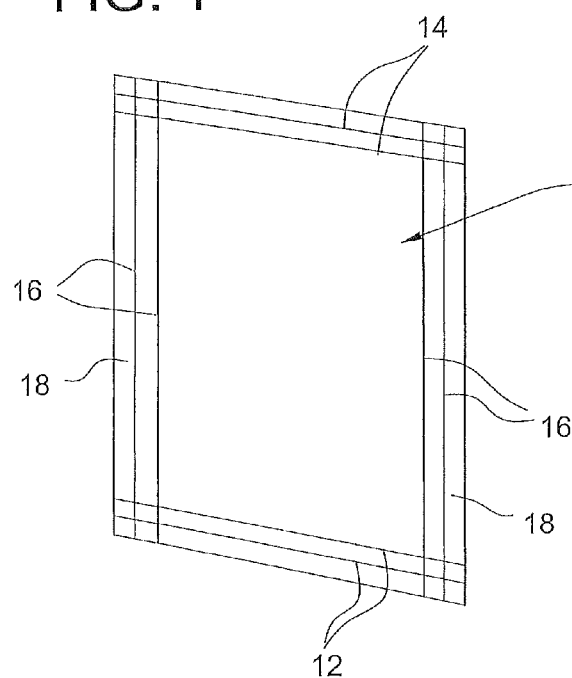
FIG. 2
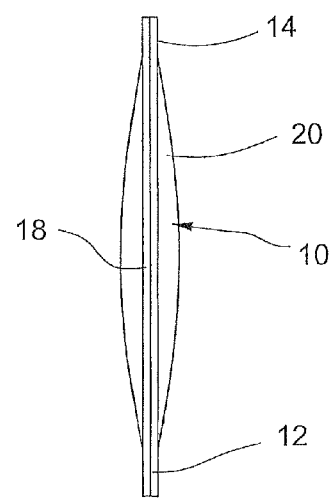
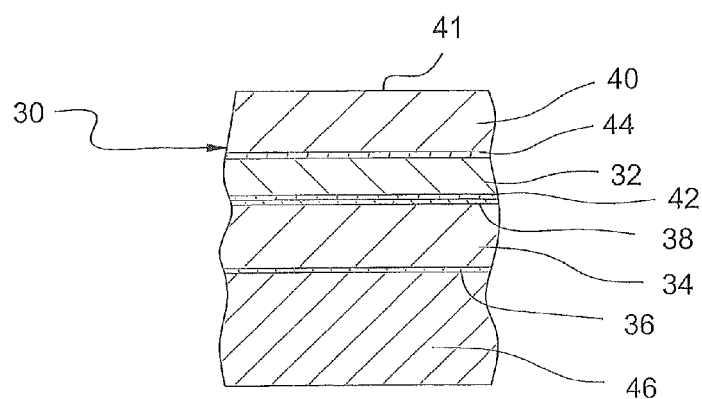
FIG. 3

CONDIMENT PACKAGE AND PACKAGING MATERIAL HAVING EXTENDED SHELF-LIFE

BACKGROUND

This invention generally concerns packages and packaging materials suitable for use in packaging a long shelf-life. More particularly, this invention relates to a package and a packaging material suitable for extended storage of highly acidic condiments.

Frequently, condiments are packaged in personal size portions for consumer use. Those personal size portion packages have numerous advantages to the ultimate consumer. Usually, the package is disposable so that once the package has been opened and the desired amount of its content has been used, the opened package and any material remaining therein can be discarded in any convenient trash receptacle. As a result, the ultimate consumer need not be concerned about storage of the package after its use. Moreover, the consumer need not worry about spillage, or leakage of product remaining in an opened package.

From the perspective of a merchant, such as the purveyor of fast foods, individual sized portions of condiments are both convenient and desirable. For example, the merchant only provides the customer with the number of packages needed so that waste is avoided. Likewise, the merchant avoids the task of hygienically refilling condiment dispensers for use by the customer or ultimate consumer.

In the past, materials for making or assembling packages for individual condiment portions have included laminated film structures including a metallic foil layer, such as aluminum. In some instances, the film structure includes a barrier between the foil layer and the condiment to restrict passage of oxygen through the film structure. Oxygen is known to be a source of degradation and/or spoilage of condiments. Other layers may also be used in a packaging film structure to enhance puncture resistance and other desirable characteristics.

While condiments such as ketchup, mayonnaise, tartar sauce, mustard, and the like have been successfully packaged in foil-based film packages, the known packages have not been suitable for use with all condiments. For example, when highly acidic condiments are packaged, and subjected to storage over a period of months, the acidic components of the condiment can attack and react with the foil layer resulting in generation of reaction gases, internal pressure in the package, and even failure of the package itself.

In the past, to avoid those difficulties, highly acidic condiments have been packaged in glass containers or bottles. Depending on the enclosed volume of such glass containers, those containers are comparatively expensive as packaging options. Furthermore, glass containers are fragile and susceptible to breakage when subjected to rough handling or exposure to particularly low temperatures. Moreover, in contrast to flexible packaging products, glass containers are substantially heavier.

Plainly, the need continues to exist for a packaging solution which obviates those and other difficulties with the known packages and packaging materials. Nevertheless, to be practical, any packaging solution which overcomes such known difficulties should be amenable to use in commonly available condiment packaging equipment.

SUMMARY

A packaging material suitable for use in containers with extended shelf-life should exhibit at least two necessary characteristics: the material should block transmission of light; and the material should essentially block transmission of oxygen. Where the packaging material must also safely contain a product having an aggressive acidic content, the packaging material also needs to essentially prevent acidic constituents from deleteriously attacking components of the packaging material.

In accord with this invention, a suitable packaging material is fashioned from a composite of several layers. One layer is a light-blocking material, such as, for example, a thin aluminum foil. Another layer of the packaging material may be a barrier layer having a polymeric material core coated with a very thin aluminum oxide coating on the one side. A high quality coating of clear vapor deposition aluminum oxide on the barrier layer operates to provide additional blockage of oxygen permeation through the packaging material to a product and simultaneously prevents migration or penetration of acidic material of a product into the packaging material.

When the packaging material will be exposed as the external surface of a product, the packaging material may include a printable layer on the light-blocking material on a side opposite to the barrier layer.

Where the packaging material will itself constitute the package, a sealing layer may be provided on the barrier layer, on the side of the barrier layer which is remote from the light-blocking layer. Such a sealing layer allows the packaging material to be formed into a container by making longitudinal as well as transverse seams in the packaging material.

The barrier layer and the printable layer may be fabricated from a polymeric material selected from the group consisting of polyethylene terephthalate, ethylene vinyl copolymers, polypropylene, polyethylene, and combinations thereof. Preferably, though, the barrier layer and the printable layer are fashioned from polyethylene terephthalate.

Depending upon the materials selected for the printable layer, the light-blocking layer, and the barrier layer, suitable adhesives may be used between adjacent layers of the packaging material. While the composite layered structure of the packaging material may be manufactured in a variety of ways, one suitable process is coextrusion of the various layers.

A package fashioned from the packaging material is suitable for long-term storage of highly acidic materials including, for example and without limitation, pepper sauce. More specifically, an individual portion size of pepper sauce packaged in a material according to this invention demonstrated a shelf-life in excess of three years without observable package degradation or organoleptic product property deterioration.

BRIEF DESCRIPTION OF THE DRAWINGS

Many objects and advantages of the present invention will be apparent to those skilled in the art when this description is read in conjunction with the attached drawings wherein like reference numerals are applied to like elements and wherein:

FIG. 1 is a perspective view of a package constructed according to the description herein;

FIG. 2 is a side elevation of the package of FIG. 1; and

FIG. 3 is an enlarged cross-sectional view (not to scale) of the material from which the package of FIG. 1 is assembled.

DETAILED DESCRIPTION

Turning now to FIG. 1, one embodiment of a condiment package 10 constructed in accord with the teachings of this invention is schematically illustrated. The condiment package 10 may, of course, have a variety of shapes and configurations. Typically, however, the condiment package 10 is configured such that it can be easily assembled and filled using conventional or otherwise readily available packaging equipment.

To that end, the condiment package 10 as shown may be fabricated by equipment that forms a tubular structure from two strips of flexible packaging material by creating a pair of parallel longitudinally extending seams connecting corresponding longitudinal sides of the strips. Transversely extending seams crimp the tubular structure at predetermined, regularly spaced intervals to seal an end of the tubular structure. Suitable filling apparatus inserts a predetermined volume of condiment into the end-sealed tubular structure. Thereafter, the filled tubular structure receives a second transverse seal above the filled condiment to enclose and seal the condiment in the condiment package. Next the filed, sealed, condiment package is severed from the tubular structure.

The condiment package 10 (see FIG. 1) illustrates a package that has been prepared consistent with the fabrication process outlined above. Accordingly, the condiment package 10 may exhibit a generally rectangular shape. Extending longitudinally along the condiment package 10, one or more longitudinal seals 16 may be seen adjacent the longitudinal juxtaposition of the edges 18 of the material strips from which the condiment package has been fabricated. The longitudinal seals are effective to provide a full, liquid-containing seal at the corresponding edge of the strip material. At one edge of the condiment package 10, one or more transversely extending seals 12 may be observed. The first transversely extending seals 12 extend across the full width of the condiment package 10 and are effective to provide a full, liquid-containing seal at that edge of the condiment package.

At the edge of the condiment package 10 opposite from the first transversely extending seals 12, one or more second transverse seals 14 are provided which also extend fully across the width of the condiment package 10 and which are effective to provide a full, liquid-containing seal at the corresponding edge of the condiment package 10.

The longitudinal spacing between the first transverse seal 12 and the second transverse seal 14, in combination with the perimeter or girth of the condiment package 10, define a predetermined volumetric capacity of the resulting condiment package 10. For purposes of this invention, a preferred typical volumetric capacity would be the volume typically associated with an individual portion of the condiment contained within the package 10. By way of example, a volume in the range of about 0.125 ounce to about 2 ounces may be appropriate for a personal-size portion, while a volume of about 1.5 ounces is preferred. When the condiment package 10 has been constructed and filled as discussed, the wall 20 of the package 10 (see FIG. 2) typically is not flat, but bulges convexly outwardly on each side of the package to accommodate the liquid condiment contained therein.

While condiment packages are known which can accommodate certain condiments, including for example ketchup, mustard, mayonnaise, tartar sauce, and marinara sauce, the known packages are fashioned from materials which are not suitable for long-term storage, i.e., long shelf-life, of highly acidic condiments. Those highly acidic components tend to degrade the known packaging material over time such that package failure or product compromise occurs.

The present invention provides a flexible packaging material 30 (see FIG. 3) suitable for fabrication of a condiment package 10 of the type described above, where the condiment package 10 can hold a highly acidic condiment for at least three years without failure or degradation of the packaging material and without degradation or compromise of the packaged highly acidic condiment.

Preferably, the flexible packaging material 30 is prepared as an elongated strip of material which is suitable for use in existing equipment adapted to manufacture and fill personal-sized condiment packages. An important feature of the packaging material 30 of this invention is the inclusion of a flexible sheet or layer of light-blocking material 32. This light-blocking layer 32 imparts opaqueness to the packaging material 30 and any package constructed therefrom. Opaqueness and light-blocking characteristics are important because light is known to be a mechanism that can cause deterioration or degradation of edible products when those products are exposed to light of extended periods of time, and is a significant problem when a storage life on the order of years is required.

While many different materials may be selected for the light blocking layer 32, a thin flexible metallic foil is preferred. More preferably, a thin metal foil such as one made of aluminum, tin, copper, or the like is preferred, while a thin aluminum foil is most preferred. Generally, to provide the desired flexibility, an aluminum foil sheet may have a thickness lying the in range of about 0.00030 inches to about 0.00050 inches (about 30 to about 50 gauge). Preferably, the thickness of an aluminum foil sheet will be about 0.00035 inches (about 35 gauge). In addition to metallic foils, it is also within the contemplation of this invention that the light blocking layer 32 may be fabricated from a flexible substrate on which a very thin layer of metal has been deposited as a surface film.

An essential aspect the packaging material 30 is the inclusion of a barrier layer. The barrier layer preferably includes a thin substrate made from a sheet of polymeric material 34. The polymeric material 34 of the sheet is preferably selected from the group consisting of polyethylene terephthalate (PET), ethylene vinyl copolymers (EVOH), polypropylene (PP), polyethylene (PE), and combinations thereof. Most preferably, the polymeric material 34 is PET. Preferably, the polymeric sheet has a thickness lying in the range of about 0.00040 inches to about 0.00060 inches (i.e., about 40 to about 60 gauge), more preferably in the range of about 0.00045 inches to about 0.00050 inches (i.e., about 45 to about 50 gauge), and most preferably about 0.00048 inches (i.e., about 48 gauge).

The polymeric material 34 includes a pair of generally planar surfaces. At least one of those generally planar surfaces has a very thin layer of aluminum oxide 36, 38 intimately attached thereto. Preferably, each aluminum oxide layer 36, 38 may have a thickness less than about 50 nanometers (nm) (i.e., about 0.000002 inches). Since aluminum oxide coatings may be brittle, thicknesses greater that 50 nm promote cracking in the coating and preferably are avoided. That intimate attachment may, for example, be effected by vapor deposition of the aluminum oxide material on the corresponding surface of the polymeric material 34. In some nomenclatures, when the polymeric material 34 is PET, the barrier layer may be referred to as PET C1S Alox, typically meaning PET coated on one side with an aluminum oxide.

The barrier layer has several functions in the packaging material of this invention. First, the barrier layer functions to substantially prevent permeation of oxygen through the barrier layer. Because oxygen is a common cause of spoilage or degradation of a food product during long-term storage, the oxygen-limiting function of the barrier layer is important to providing a packaging material that can be used for long term storage of edible condiments. Second, the surface coating of aluminum oxide functions to essentially prevent penetration or migration of any acidic compound of the condiment through the barrier layer 34 from the side of the aluminum oxide coating 36. This function of the barrier layer is important because acidic compounds of a packaged condiment are thus effectively prevented from penetrating the packaging material to a depth where such acidic or low pH compounds can attack or react with the metallic foil 32.

A condiment package often includes a manufacturer's trademark and/or logo, as well as an ingredient list, and in some instances other information such as opening instructions, manufacturing location, bar code, and the like. Accordingly, the packaging material 30 (see FIG. 3) may also include a printable layer 40 positioned next to the light-blocking layer 32, but on the side opposite from the barrier layer 34. The printable layer 40 includes a generally planar surface 41 adapted for printing of information such as that discussed above. Typically, printing of the packaging material occurs before the packaging material is incorporated in a condiment package at least because it is difficult to print on non-planar surfaces such as the sides of a filled condiment package (see FIG. 2).

The printable layer 40 (see FIG. 3) is preferably fabricated from a polymeric material selected from the group consisting of PET, EVOH, PP, PE, and combinations thereof. Most preferably, the polymeric material 34 is PET. Preferably, the printable layer 40 has a thickness lying in the range of about 0.00040 inches to about 0.00060 inches (i.e., about 40 to about 60 gauge), more preferably in the range of about 0.00045 inches to about 0.00050 inches (i.e., about 45 to about 50 gauge), and most preferably about 0.00048 inches (i.e., about 48 gauge).

Organization of the layers in the packaging material 30 is important. Specifically, the printable layer 40 should be on the side which will be exposed to the environment. The barrier layer 34 should be on the side which will be exposed to highly acidic materials because the coating of aluminum oxide provides resistance to acid permeation and attack. The light blocking layer 32 should be sandwiched between the printable layer 40 and the barrier layer 34 so that those layers provide mechanical protection to the thin light blocking layer 32. While these layers may be constructed and assembled into the composite packaging material 30 is any desired manner, a coextrusion process may be an efficient manufacturing technique.

Depending upon the materials actually used for the various layers described above, it may be necessary or desirable to include transition materials between adjacent layers to improve adhesion and to resist delamination. To that end, a suitable adhesive layer 42 may be included between the barrier layer 34 and the light-blocking layer 32. Similarly, a suitable adhesive layer 44 may be inserted between the light-blocking layer 32 and the printable layer 40. The thickness of the layers 42, 44 is typically selected to provide the appropriate transitional and/or adhesion characteristics for the packaging material component layers. In some applications, a suitable adhesive may include low density polyethylene (LDPE) and ethylene acrylic acid (EAA).

Where the packaging material 30 will be formed into a condiment package 10 of the type depicted in FIG. 1, the packaging material 30 may further include a layer of sealant material 46 intimately attached to the barrier layer 34. A suitable sealant material may be an acrylonitrile sealant. The sealant material 46 preferably has a thickness selected so that it can be appropriately sealed against itself using pressure and/or heat such that a resulting seal is tight and impervious to a condiment. In some applications the sealant material 46 may have a thickness lying the range of about 0.00175 inches (i.e., about 1.75 mil).

A condiment package fabricated from packaging material as described above is suitable for containing a highly acidic condiment. Typical highly acidic condiments include, for example, pepper sauce. A pepper sauce of the type contemplated here may be one such as is sold as TABASCO®. Typical highly acidic condiments of the type contemplated by this invention may exhibit a pH in the range of about 2.8 to about 4.0, and more specifically in the range of about 3.0 to about 3.6. At a pH in that range, it will be appreciated that acidic components can attack metals, such as aluminum or other metallic materials conventionally available for use in packaging materials, with the undesirable result that gas can be generated internally of an otherwise sealed package.

The packaging material described herein has been found to be free of such problems, and to have a shelf-life in excess of three years. In this connection, several different packaging materials were subjected to a long-term study, including one material made in accord with the teachings of this description. In the study, packages containing pepper sauce were evaluated when subjected to different sets of time and temperature conditions. Specifically, shelf-life durability was evaluated by subjecting filled condiment packages to 100° F. for a period of 6 months, and by subjecting filled condiment packages to 80° F. for a period of 36 months.

For comparative purposes, packaging materials constructed with the arrangement of the following table were evaluated:

| Layer | Variant 1 | Variant 2 | Variant 3 |
|---|---|---|---|
| Printable layer | PET, 48 gauge | PET, 48 gauge | PET, 48 gauge |
| Adhesive layer | Coextrusion of 6# LDPE and 1# EAA | Coextrusion of 6# LDPE and 1# EAA | Coextrusion of 6# LDPE and 1# EAA |
| Light-blocking layer | Aluminum foil, 35 gauge | Aluminum foil, 35 gauge | Aluminum foil, 35 gauge |
| Adhesive | Adhesive | Adhesive | Adhesive |
| Barrier layer | Coated, one side, with aluminum oxide | Uncoated | Coated, one side, with SiOX |
| Sealant layer | 1.75 mil acrylonitrile sealant | 1.75 mil acrylonitrile sealant | 1.75 mil acrylonitrile sealant |

The barrier layer of Variant 1 was provided by Pliant Corporation as a high barrier polyester film, GL-AE, while the barrier layer of Variant 3 was provided by Alcan. It was observed that Variants 2 and 3 exhibited degradation during the 100° F. test, while Variant 1 did not show degradation. Moreover, it was observed that Variants 2 and 3 exhibited degradation during the 80° F. test, whereas Variant 1 did not show degradation. Furthermore, taste tests of Variant 1 after the 36-month, 80° F. test demonstrated that the pepper sauce maintained potency as well as taste.

On the basis of those comparative tests, it is believed that the presence of the high quality clear vapor deposition of aluminum oxide coating on the inner barrier layer is important to the successful long-term shelf life of the packaging material according to this invention.

In this description the terms "about", "substantially", and "generally" are used to impart an expanded meaning to associated terms, so as to avoid strict adherence to precise values, geometric definitions, and the like. Accordingly, where the term is used in connection with a numerical value, it is intended that the associated numerical value include values within a tolerance of ±10% of the stated value.

It will now be apparent to those skilled in the art that a novel packaging material and condiment package manufactured therefrom have been described which constitute a substantial improvement over the known prior art. Moreover, it will also be apparent to those skilled in the art that numerous modifications, variations, substitutions and equivalents exist for the various features of the invention, which modifications, variations, substitutions and equivalents do not materially depart from the spirit and scope of the invention as claimed. Accordingly, it is expressly intended that all such modifications, variations, substitutions and equivalents which fall within the spirit and scope of the claimed invention be embraced thereby.

The invention claimed is:

1. An acid condiment flexible composite packaging material formed into a condiment container for containing an acidic condiment and having an interior food product facing side and an exterior packaging surface, said packaging material comprising:
   a flexible sheet of opaque light-blocking material comprising a metallic foil and a first surface;
   a flexible layer of polymeric material arranged adjacent to the first surface of the flexible sheet of opaque light-blocking material, and including a first generally planar surface and a second generally planar surface;
   a layer of aluminum oxide arranged between the flexible layer of the polymeric material and the metallic foil;
   an additional aluminum oxide layer having a thickness less than about 50 nanometers, being operable to restrict oxygen permeability of the composite packaging material, and being operable to restrict the permeability to low pH materials such that acidic or low pH compounds of an acidic condiment enclosed in the condiment container are each of:
      essentially prevented from penetrating or migrating through the flexible layer of polymeric material; and
      effectively prevented from attacking or reacting with the metallic foil; and
   the flexible sheet of opaque light-blocking material being arranged between the flexible layer of polymeric material and the exterior packaging surface of the packaging material,
   wherein the packaging material provides a shelf-life of at least three years for the acidic condiment enclosed in the condiment container.

2. The flexible composite packaging material of claim 1 wherein the metallic foil is aluminum foil.

3. The flexible composite packaging material of claim 2 wherein the aluminum foil has a thickness in a range of about 0.00030 inch to about 0.00050 inch.

4. The flexible composite packaging material of claim 3 wherein the aluminum foil has a thickness of about 0.00035 inch.

5. The flexible composite packaging material of claim 1 wherein the polymeric material is selected from a group consisting of polyethylene terephthalate, ethylene vinyl copolymers, polypropylene, polyethylene, and combinations thereof.

6. The flexible composite packaging material of claim 5 wherein the polymeric material is polyethylene terephthalate.

7. The flexible composite packaging material of claim 6 wherein the polyethylene terephthalate has a thickness in a range of about 0.00040 inch to about 0.00060 inch.

8. The flexible composite packaging material of claim 7 wherein the polyethylene terephthalate has a thickness in a range of about 0.00045 inch to about 0.00050 inch.

9. The flexible composite packaging material of claim 1 wherein the flexible sheet includes a second surface and wherein a printable layer is adhered to the second surface.

10. The flexible composite packaging material of claim 9 wherein the printable layer is a polymeric material.

11. The flexible composite packaging material of claim 10 wherein the polymeric material of the printable layer is selected from a group consisting of polyethylene terephthalate, ethylene vinyl copolymers, polypropylene, polyethylene, and combinations thereof.

12. The flexible composite packaging material of claim 11 wherein the polymeric material of the printable layer is polyethylene terephthalate.

13. The flexible composite packaging material of claim 12 wherein the printable layer has a thickness in a range of about 0.00040 inch to about 0.00060 inch.

14. The flexible composite packaging material of claim 13 wherein the printable layer has a thickness in a range of about 0.00045 inch to about 0.00050 inch.

15. The flexible composite packaging material of claim 1 wherein the flexible layer is adhered to the flexible sheet by an adhesive.

16. The flexible composite packaging material of claim 9 wherein the printable layer is adhered to the flexible sheet by an adhesive.

17. The flexible composite packaging material of claim 16 wherein the flexible layer is adhered to the flexible sheet by an adhesive.

18. The flexible composite packaging material of claim 1, wherein the flexible layer is adhered to the flexible sheet by coextrusion.

19. The flexible composite packaging material of claim 9, wherein the printable layer is adhered to the flexible sheet by coextrusion.

20. A flexible package for an acidic food product comprising:
   a pouch having a generally rectangular shape, enclosing a volume in a range of about 0.125 ounces to about 2 ounces, and having at least one wall, the wall including:
      a flexible sheet of opaque light-blocking material, having a first surface and a second surface, the flexible sheet of opaque light-blocking material being a metallic foil;
      a printable layer of polymeric material adhered to the second surface of the flexible sheet and exposed to the environment;
      a flexible layer of polymeric material adhered to the first surface of the flexible sheet, and comprising a first and second generally planar surface,
      at least the second generally planar surface of the flexible layer of polymeric material having a layer of aluminum oxide thereon so as to be substantially integral therewith,
      the aluminum oxide layer having a thickness less than about 50 nanometers, being operable to restrict oxygen permeability of the composite packaging material, and being operable to restrict the permeability to low pH materials such that acidic or low pH compounds of an acidic food product enclosed in the pouch are each of:

essentially prevented from penetrating or migrating through the flexible layer of polymeric material; and effectively prevented from attacking or reacting with the metallic foil, the first generally planar surface of the flexible polymeric layer disposed toward the first surface of the flexible sheet of opaque light-blocking material, and the second generally planar surface of the flexible layer of polymeric material disposed away from the first surface of the flexible sheet; and a sealant layer adhered to the flexible layer of polymeric material, at the second generally planar surface thereof, wherein when the pouch is formed, the sealant layer is joined to itself along seams extending longitudinally and transversely of the pouch, and wherein the pouch provides a shelf-life of at least three years for an acidic food product enclosed therein.

21. The flexible package of claim 20 wherein the metallic foil is aluminum foil.

22. The flexible package of claim 21 wherein the aluminum foil has a thickness in a range of about 0.00030 inch to about 0.00050 inch.

23. The flexible package of claim 22 wherein the aluminum foil has a thickness of about 0.00035 inch.

24. The flexible package of claim 20 wherein the polymeric material of the flexible layer, the printable layer, or both, is selected from a group consisting of polyethylene terephthalate, ethylene vinyl copolymers, polypropylene, polyethylene, and combinations thereof.

25. The flexible package of claim 24 wherein the polymeric material is polyethylene terephthalate.

26. The flexible package of claim 25 wherein the polyethylene terephthalate has a thickness in a range of about 0.00040 inch to about 0.00060 inch.

27. The flexible package of claim 26 wherein the polyethylene terephthalate has a thickness in a range of about 0.00045 inch to about 0.00050 inch.

28. The flexible package of claim 24 wherein the polymeric material of the printable layer is selected from a group consisting of polyethylene terephthalate, ethylene vinyl copolymers, polypropylene, polyethylene, and combinations thereof.

29. The flexible package of claim 28 wherein the polymeric material of the printable layer is polyethylene terephthalate.

30. The flexible package of claim 29 wherein the printable layer has a thickness in a range of about 0.00040 inch to about 0.00060 inch.

31. The flexible package of claim 30 wherein the printable layer has a thickness in a range of about 0.00045 inch to about 0.00050 inch.

32. The flexible package of claim 20 wherein the flexible sheet and the flexible layer are attached by an adhesive.

33. The flexible package of claim 20 wherein the flexible sheet and the printable layer are attached by an adhesive.

34. The flexible package of claim 33 wherein the flexible sheet and the flexible layer are attached by an adhesive.

35. A flexible package for an acidic condiment comprising:

a pouch having a generally rectangular shape, enclosing a volume in a range of about 0.125 ounces to about 2 ounces, and having at least one wall, the wall including:

a flexible sheet of opaque light-blocking material, having a first surface and a second surface, the flexible sheet of opaque light-blocking material being a metal foil;

a printable layer of polymeric material adhered to the second surface of the flexible sheet and exposed to the environment;

a flexible layer of polymeric material adhered to the first surface of the flexible sheet, and comprising a first and second generally planar surface, at least one of the first and second generally planar surfaces of the flexible layer of polymeric material having a layer of aluminum oxide thereon so as to be substantially integral therewith, the aluminum oxide layer having a thickness less than about 50 nanometers, being operable to restrict oxygen permeability of the composite packaging material, and being operable to restrict the permeability to low pH materials, the first generally planar surface of the flexible layer or polymeric material disposed toward the first surface of the flexible sheet, and the second generally planar surface of the flexible layer of polymeric material disposed away from the first surface of the flexible sheet of opaque light-blocking material; and a sealant layer adhered to the flexible layer of polymeric material, at the second generally planar surface thereof, wherein when the pouch is formed, the sealant layer is joined to itself along seams extending longitudinally and transversely of the pouch, and wherein the pouch provides a shelf-life of at least three years for an acidic condiment enclosed therein, wherein the pouch contains the acidic condiment having a pH in a range of about 2.8 to about 4.0.

36. The flexible package of claim 35 wherein the pouch contains pepper sauce.

37. The flexible package of claim 35 wherein the sealant layer comprises an acrylonitrile sealant.

38. A flexible composite condiment package having sealed edges, an interior condiment facing side, an exterior packaging surface, and a package wall, wherein the package wall of said package comprises:

a flexible sheet of opaque light-blocking material comprising a metallic foil;

a flexible layer of polymeric material arranged adjacent to the flexible sheet of opaque light-blocking material;

a layer of aluminum oxide arranged between the flexible layer of the polymeric material and the metallic foil;

an other layer of aluminum oxide arranged between the flexible layer of the polymeric material and the interior food product facing side;

the other aluminum oxide layer having a thickness less than about 50 nanometers, being operable to restrict oxygen permeability of the composite packaging material, and being operable to restrict the permeability to low pH materials such that acidic or low pH compounds of a condiment enclosed in the condiment package are each of:

essentially prevented from penetrating or migrating through the flexible layer of polymeric material; and effectively prevented from attacking or reacting with the metallic foil;

the flexible sheet of opaque light-blocking material being arranged between the flexible layer of polymeric material and the exterior packaging surface of the packaging material; and at least one of:
- a sealant material layer arranged inside of the flexible layer of polymeric material, and
- a printable layer arranged outside of the metallic foil, and wherein the package provides a shelf-life of at least three years for the condiment enclosed in the condiment package.

39. The package of claim 38 wherein the package comprises each of:
- the sealant material layer, and
- the printable layer.

* * * * *